(No Model.)
J. A. LYNCH.
FLEXIBLE PIPE COUPLING.
No. 523,583. Patented July 24, 1894.
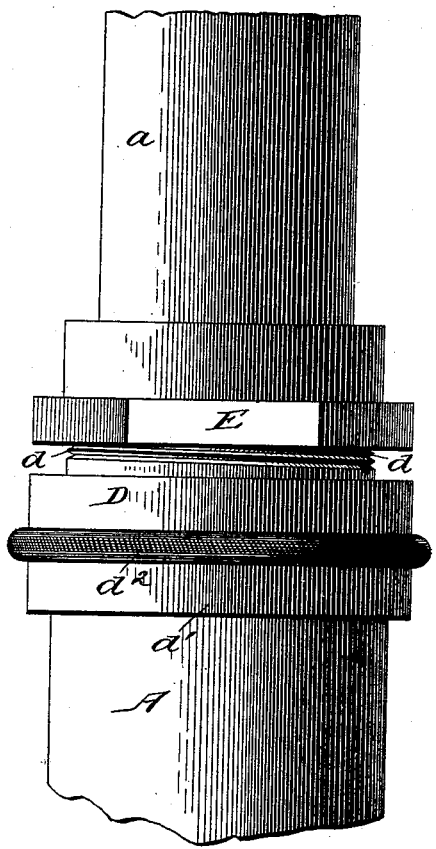
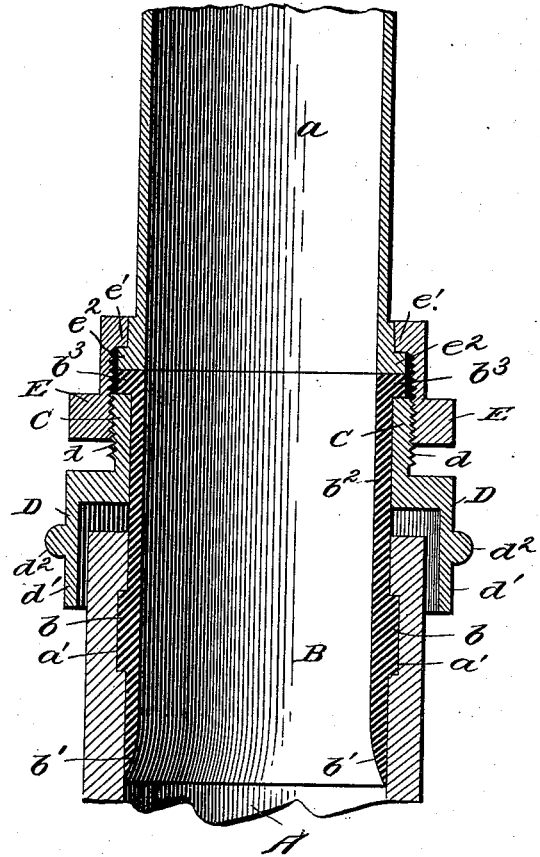
Witnesses
Edwin L Bradford
Patrick H. O'Farrell
James A. Lynch Inventor
By Patrick O'Farrell
Attorney

UNITED STATES PATENT OFFICE.

JAMES A. LYNCH, OF ST. LOUIS, MISSOURI.

FLEXIBLE PIPE-COUPLING.

SPECIFICATION forming part of Letters Patent No. 523,583, dated July 24, 1894.

Application filed October 25, 1893. Serial No. 489,115. (No model.)

*To all whom it may concern:*

Be it known that I, JAMES A. LYNCH, a citizen of the United States of America, residing at St. Louis, in the State of Missouri, have invented certain new and useful Improvements in Flexible Pipe-Couplings, of which the following is a specification, reference being had therein to the accompanying drawings.

This invention contemplates certain new and useful improvements in pipe couplings or joints designed for coupling a pipe to the horn of an earthenware, or other bowl, of a water closet, urinal, wash-basin or the like, and the object of the invention is to provide a flexible air and water-tight connection which shall be simple and inexpensive and prevent leakage as well as to remove strain from the horn of the bowl, or its equivalent.

The invention consists, primarily, of a metallic nipple designed to be secured to the end of a pipe and having a shield extended therefrom for overlapping and inclosing the end of the horn of a bowl.

The invention further consists of a flexible or yielding nipple firmly seated in the horn of a bowl, and a metallic nipple inclosing said flexible nipple and coupled to a pipe.

The invention further consists of a metallic nipple having a shield extending therefrom, a rubber or flexible nipple designed to fit snug in the horn of a bowl, or its equivalent, and a coupling nut for uniting said metallic and flexible nipples to the end of a pipe, said shield being designed to extend over and inclose said horn, whereby a yielding or flexible connection is had between the horn and the pipe.

The invention also comprises the details of construction, combination and arrangement of parts, substantially as hereinafter fully set forth and particularly pointed out in the claims.

In the accompanying drawings:—Figure 1 is a view in side elevation showing a portion of a bowl and the pipe. Fig. 2 is a vertical sectional view.

Referring to the drawings, A designates the horn of a water-closet bowl, the latter being broken away, and $a$ a metallic pipe designed to be connected to said horn. In the horn is formed a central bore and a circumferential groove or recess $a'$, the latter being located near the end of the horn.

B is a flexible nipple composed of rubber or other suitable material. This nipple is made cylindrical and on its outer surface is provided with a circumferential flange $b$ which fits snug within the groove or recess $a'$ whereby the nipple is held from within the horn. The inner end of the nipple is provided with a bevel $b'$ so as to form no obstruction. The nipple is extended beyond the end of the horn and this extended portion $b^2$ is slightly reduced in thickness, and at its outer end is provided with a flange $b^3$.

C is a metallic nipple having an exterior screw thread $d$. Through this nipple the flexible nipple B is designed to project, the flanged end $b^3$ of the latter forming a stop for said nipple C. From this nipple extends a shield D, which consists of a right angular shell, the outer cylindrical portion $d'$ of which is designed to overlap and inclose the end of horn A. At or near its outer end the shield D has an exterior milled head or flange $d^2$ by which the same may be held or turned.

E is a coupling nut having an interior female screw thread $e$ and a flange $e'$, which latter is designed to engage a flange $e^2$ on the end of pipe $a$, while the female thread works in the exterior thread on nipple C.

The manner of assembling and tightening the parts will be readily understood from what has gone before. It will be seen that by means of my invention a secure flexible connection is established between the end of a pipe and the horn of a water-closet bowl or other earthenware fixture.

While I have shown and described my improved joint or coupling in connection with a water-closet bowl, yet it will be understood that the same is equally applicable to urinals, wash-basins or other earthenware vessels requiring a flexible joint or connection with a rigid pipe.

The advantages of my invention are apparent to those skilled in the art to which it appertains and it will be specially observed that my joint or coupling is extremely simple and inexpensive; that by means thereof perfect connection or coupling can be had and that all strain is removed from the horn of the earthenware vessel.

I claim as my invention—

1. The combination with a water-closet bowl having a horn, of a metallic nipple having a hollow shield designed to overlap and inclose said horn, and a flexible nipple designed to fit within said horn and said metallic nipple, and unite the same and means engaging said nipple for connecting the same to a pipe, substantially as set forth.

2. The combination with a water-closet bowl having a horn, of a metallic nipple having a hollow-shield designed to overlap and inclose said horn, and a flexible nipple provided with a flange fitting in an interior groove of said horn, and designed to unite the latter and said metallic nipple and means engaging the metallic nipple for connecting the same to a pipe, substantially as set forth.

3. The combination with a water-closet bowl having a horn, of a metallic nipple having a shield designed to overlap and inclose said horn, and a flexible nipple provided with a flange fitting in an interior groove of said horn, said flexible nipple being also provided with an end-flange against which bears the end of said metallic nipple and means engaging said metallic nipple for connecting the same to a pipe and binding said flanged end of said flexible nipple between said metallic nipple and said pipe, substantially as set forth.

4. The combination with a water-closet bowl having a horn, of a metallic nipple having a shield designed to overlap and inclose said horn, a flexible nipple designed to fit within said horn, and a coupling nut engaging said metallic nipple and designed to connect the latter to a pipe, and to bind said flexible nipple between said metallic nipple and said pipe, substantially as set forth.

5. The combination with a water-closet bowl having a horn, and a pipe, of a flexible nipple secured to said horn and projecting therefrom, a metallic nipple inclosing said flexible nipple, and the coupling nut engaging said metallic nipple and holding the same and said flexible nipple to said pipe, substantially as set forth.

6. The combination with a water-closet bowl having a horn, of a flexible nipple secured to the interior of said horn, a metallic nipple inclosing said flexible nipple and designed to overlap and inclose said horn, a pipe, and a coupling nut engaging said metallic nipple and binding said flexible nipple to said pipe, substantially as and for the purpose set forth.

7. The combination with a bowl having a horn provided with an inner groove or recess, of a flexible nipple fitted in said horn and having an outer flange corresponding to said groove or recess, the metallic nipple having a shield extended therefrom and inclosing said flexible nipple and the end of said horn, and the coupling nut, substantially as set forth.

8. The combination with the bowl having its horn provided with an inner groove or recess, and a pipe designed to be connected thereto and having a flanged end, of the rubber or flexible nipple having a circumferential flange fitting said groove or recess and also having an outer flanged end, the metallic nipple inclosing said flexible nipple and having an exterior thread, a cylindrical shell extending from said nipple and inclosing the end of said horn, and the interiorly threaded coupling nut having a flange and designed to bind the flanged ends of said pipe and flexible nipple, substantially as set forth.

In testimony whereof I affix my signature in presence of two witnesses.

JAMES A. LYNCH.

Witnesses:
C. A. GHIO,
WM. S. KING.